(12) United States Patent
Nehring et al.

(10) Patent No.: US 11,413,715 B2
(45) Date of Patent: Aug. 16, 2022

(54) STORAGE MECHANISM

(71) Applicant: TRN Industries, LLC, Tampa, FL (US)

(72) Inventors: Terry Nehring, Tampa, FL (US); Daniel Nehring, Tampa, FL (US); Tyler Ernst, Tampa, FL (US); Jennifer Ernst, Tampa, FL (US)

(73) Assignee: TRN Industries, Tampa, FL (US)

( * ) Notice: Subject to any disclaimer, the term of this patent is extended or adjusted under 35 U.S.C. 154(b) by 0 days.

(21) Appl. No.: 17/542,438

(22) Filed: Dec. 5, 2021

(65) Prior Publication Data
US 2022/0088728 A1 Mar. 24, 2022

(51) Int. Cl.
*B23P 19/04* (2006.01)
*B60D 1/58* (2006.01)

(52) U.S. Cl.
CPC ............... *B23P 19/04* (2013.01); *B60D 1/58* (2013.01)

(58) Field of Classification Search
CPC .................................. B60D 1/58; B23P 19/04
See application file for complete search history.

(56) References Cited

U.S. PATENT DOCUMENTS

| | | | | |
|---|---|---|---|---|
| 3,985,324 | A * | 10/1976 | Larson | A47F 5/0823 248/220.42 |
| 7,055,844 | B1 * | 6/2006 | Bostedt | B60D 1/52 224/403 |
| 7,677,514 | B1 * | 3/2010 | Palmer | B60K 15/067 248/250 |
| 8,893,939 | B2 * | 11/2014 | Brass | B60D 1/60 224/558 |
| 9,004,521 | B2 * | 4/2015 | Dringenberg | B60D 1/58 280/491.4 |
| 9,624,029 | B2 * | 4/2017 | Nehring | B60D 1/58 |

\* cited by examiner

*Primary Examiner* — Bayan Salone
(74) *Attorney, Agent, or Firm* — Chris Tanner; FYPA PLLC (57) ABSTRACT

Various embodiments of a storage system for use with weight distribution trailer hitches are disclosed. The storage system would be used by someone with a towing vehicle, a boat or RV, and a trailer hitch to link these two. During the times these items are not in-motion, these weight distribution hitches have large parts and take up a lot of space. Such a customer can put their extra hitch-parts in the storage system, which keeps the weight distribution system nicely stored for example on the trailers beams AKA the trailer's A-frame rails or frame.

12 Claims, 16 Drawing Sheets

FIG. 5B (no load therein, horizontal attachment)

FIG. 6A (loaded with weight distribution bars)
(hitch head not shown)

FIG. 6B (loaded with weight distribution bars)
(hitch head not shown)

FIG. 6C (loaded with weight distribution bars)
(hitch head not shown)

FIG. 10 (installing the system 700)

STORAGE MECHANISM

BACKGROUND OF THE INVENTION

Figure 1:
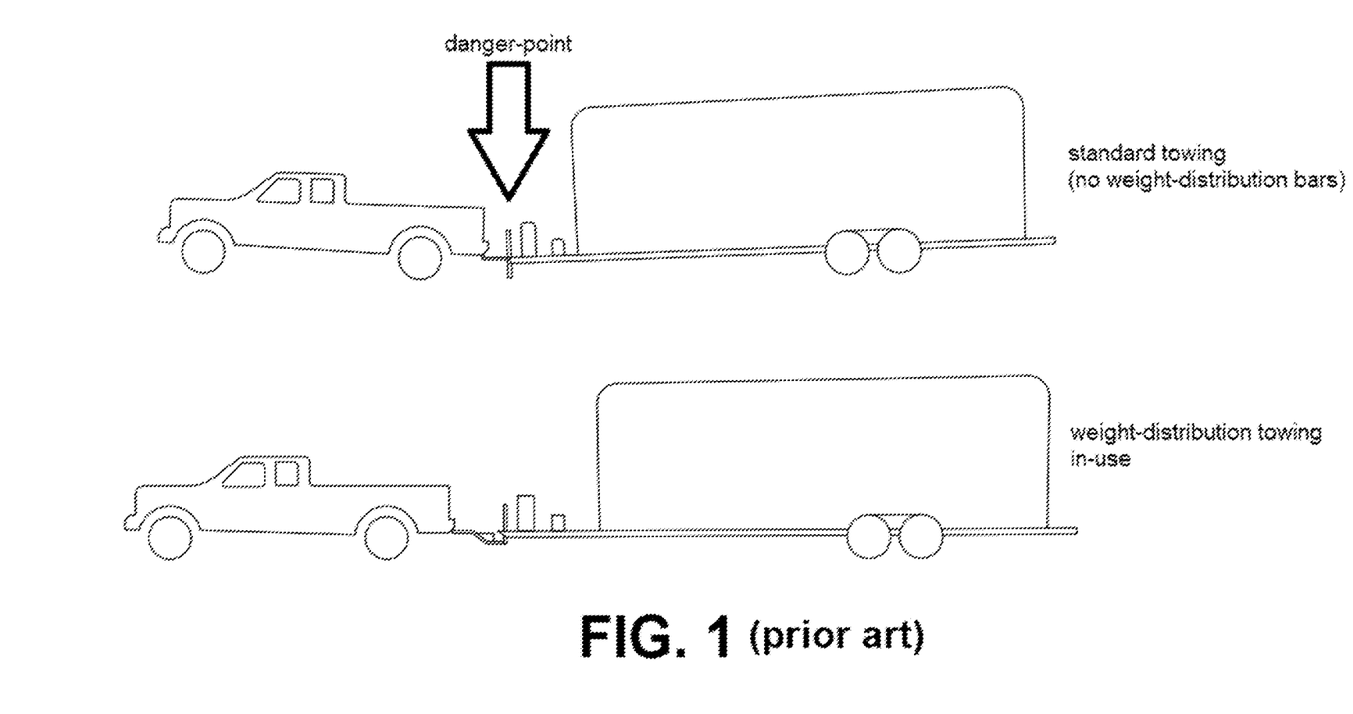
FIG. 1 (Prior Art) shows an example of improper weight distribution where a vehicle is pulling a heavy device using a trailer hitch.
Figure 2:
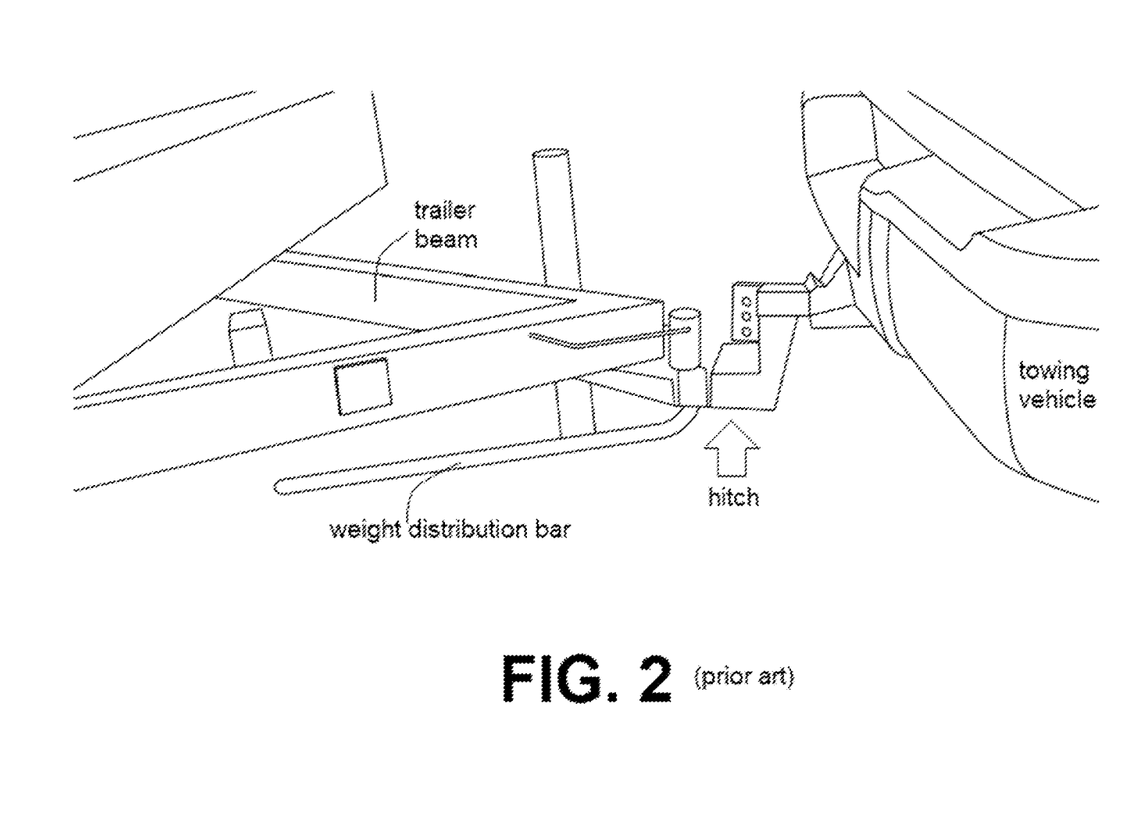
FIGS. 2, 3, 4A, and 4B (Prior Art) shows some example weight distribution hitches.

Proper weight-distribution is an important aspect of trailer hitches. FIG. 1 (Prior Art) shows an example of why. Improper weight distribution can put a lot of strain on the vehicle pulling the trailer and create various dangers and hazards. To address this, there exists certain types of trailer hitch equipment known as weight distribution hitches. Such items are a great advancement in travel convenience, but take up a lot of space and weight when they are not in use.

FIGS. 2, 3, 4A-4B (Prior Art) shows some example weight distribution hitches. To slightly over-simplify, a typical weight distribution system mainly comprises 2 weight distribution bars, and a ball hitch (hitch body). There are other elements to a weight distribution system, but these are unimportant for explaining the various embodiments herein. The parts are very heavy, the weight distribution bars each weigh around 40 lbs. and the hitch head (ball hitch) can be as much as 50 lbs. These items are also dirty, exposed to weather, exposed to road dust, need to be oiled, in that some models of the ball hitches require grease during use. Some larger utility trailers, car haulers, boat trailers, and towable horse trailers also use weight distribution hitches such as those shown in FIGS. 2, 3, and 4A-4B (Prior Art).

Ideal Customer for the Embodiments Herein

Someone who owns a towing vehicle, a boat or RV, and a trailer hitch to link these two. They have towed their items, and parked the item. They now want to drive their towing vehicle without the host RV for e.g. errands, and their hitch is not currently in-use. Such a customer can put their extra hitch-parts in the embodiments herein. As a short-cut, a trailer owner could put the weight distribution bars, wrap them in plastic tarp and just lay them underneath the trailer. However, some of these hitches are $800-$1200 and sellable for scrap, thus subject to theft. Accordingly, many owners take their weight distribution bars and hitch-heads and put them inside the storage compartment of the trailer. These compartments are very small and provide minimal space, and most owners would rather save that space for other items.

Someone stealing a hitch-kit occurs mostly when the trailer or RV is in storage, not so much in live-usage although that can happen also. The various weight distribution component parts are not much good without the main hitch-body, but still can be sold for scrap.

Some customers just toss the extra hitch parts into the bed of their tow vehicle, or a truck box. Or they just toss the extra hitch parts into the floor of their trailer. They take them home in the garage or leave them laying in the truck bed. They may use a heavy wooden box, or steel box, and people are constantly bumping their toes on this bulky heavy box. Or, when parked, hitch is not in use, they just kind of shove these extra parts, shove them cross-wise into some space of gap within the hitch itself. They can also lay them across the trailer frame.

As such, storing the weight distribution bars and hitch heads can be an annoyance. These items are large, bulky, heavy, dirty, and in-the way. Regarding product legacy and evolution over years, weight distribution systems don't change too much over time. Oddly, any new advancement in e.g. 3D printing or otherwise have been unimportant in this field. Trailer hitches are not much simpler or smaller in 2021 than in e.g. 1985, but instead are actually heavier since the trailers have gotten much larger than the 60-70's models.

Consequently, an improved hitch-lock system is desired, especially a system that stores and locks up both the hitch bars and hitch head together.

DETAILED DESCRIPTION OF THE PREFERRED EMBODIMENTS

Figure 5A:
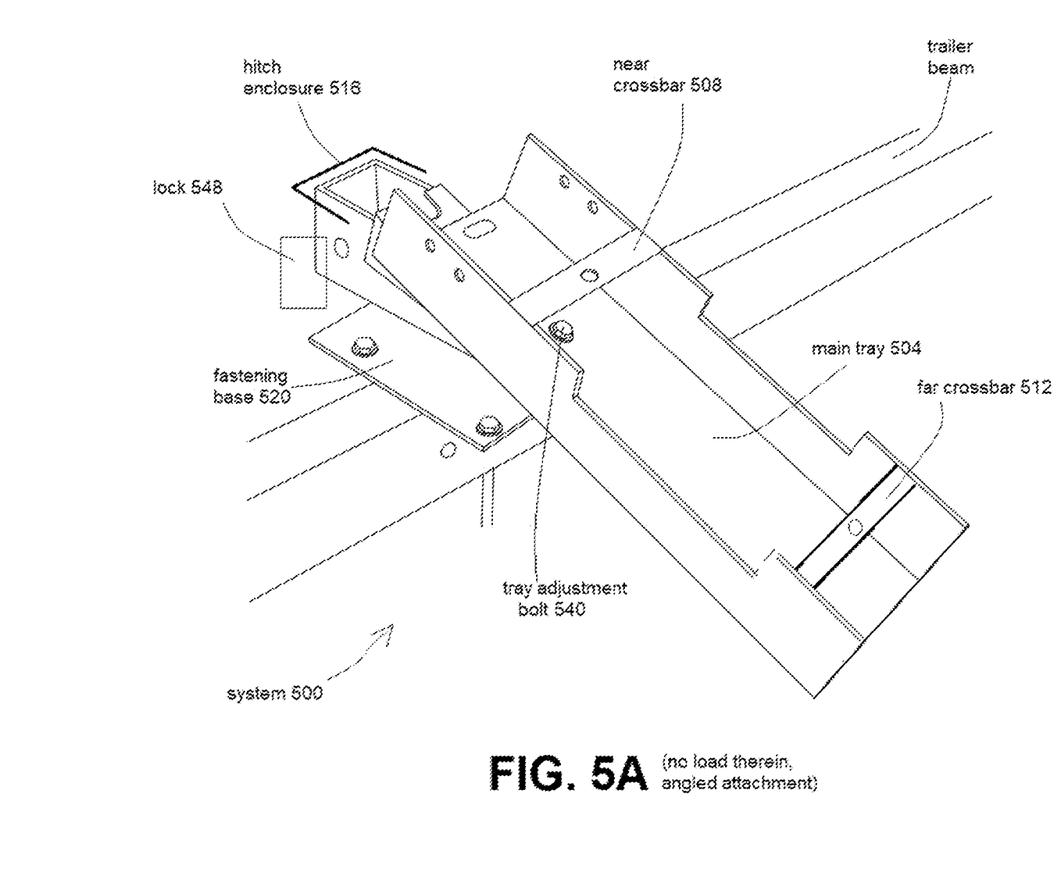
FIGS. 5A and 5B show embodiments of a storage system for use with weight distribution trailer hitches.
Figure 5B:
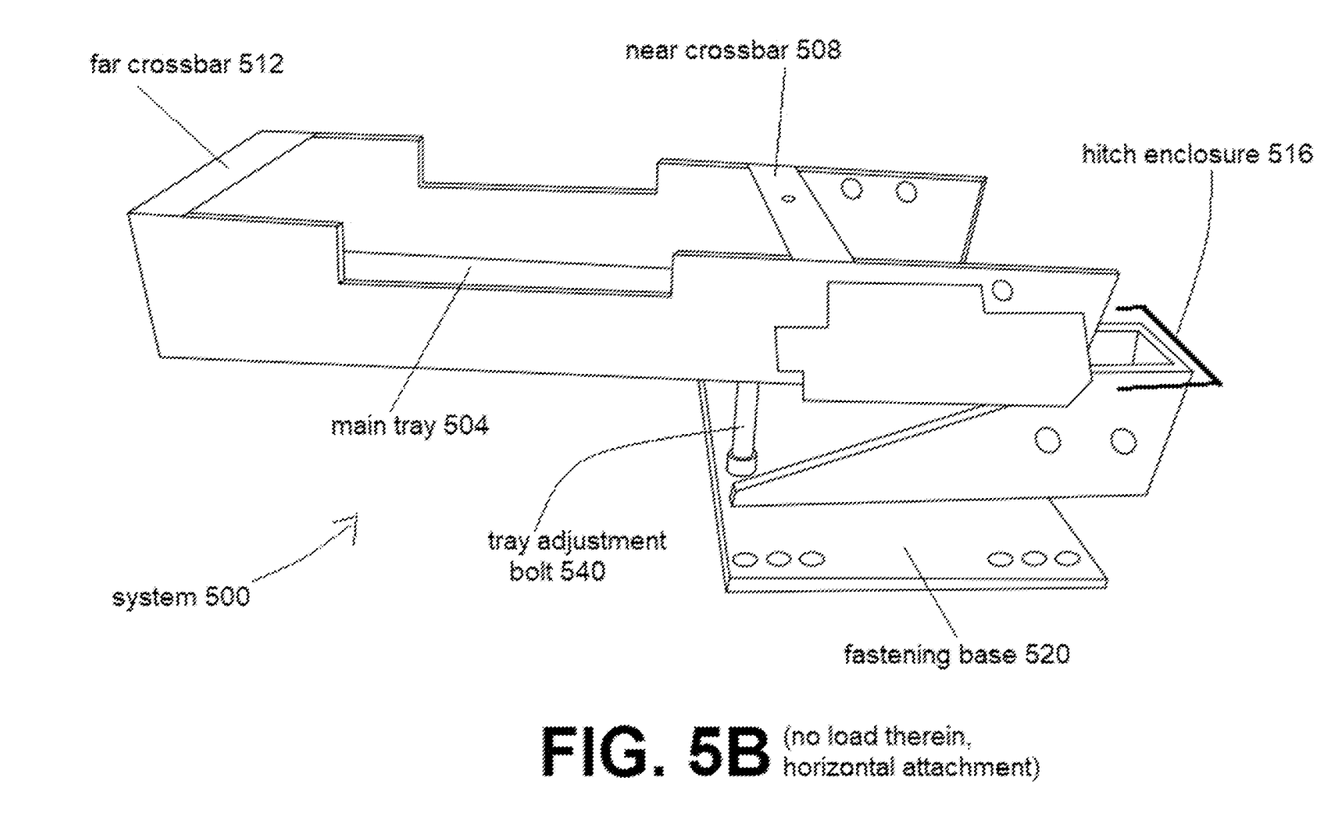

FIGS. 5A and 5B show embodiments of a storage system 500 for use with weight distribution trailer hitches. A further embodiment of a storage system 700 will be separately disclosed. The system 500 comprises a main tray 504, a near crossbar 508, a far crossbar 512, a hitch-head enclosure 516, and an attachment plate 520.

Figure 3:
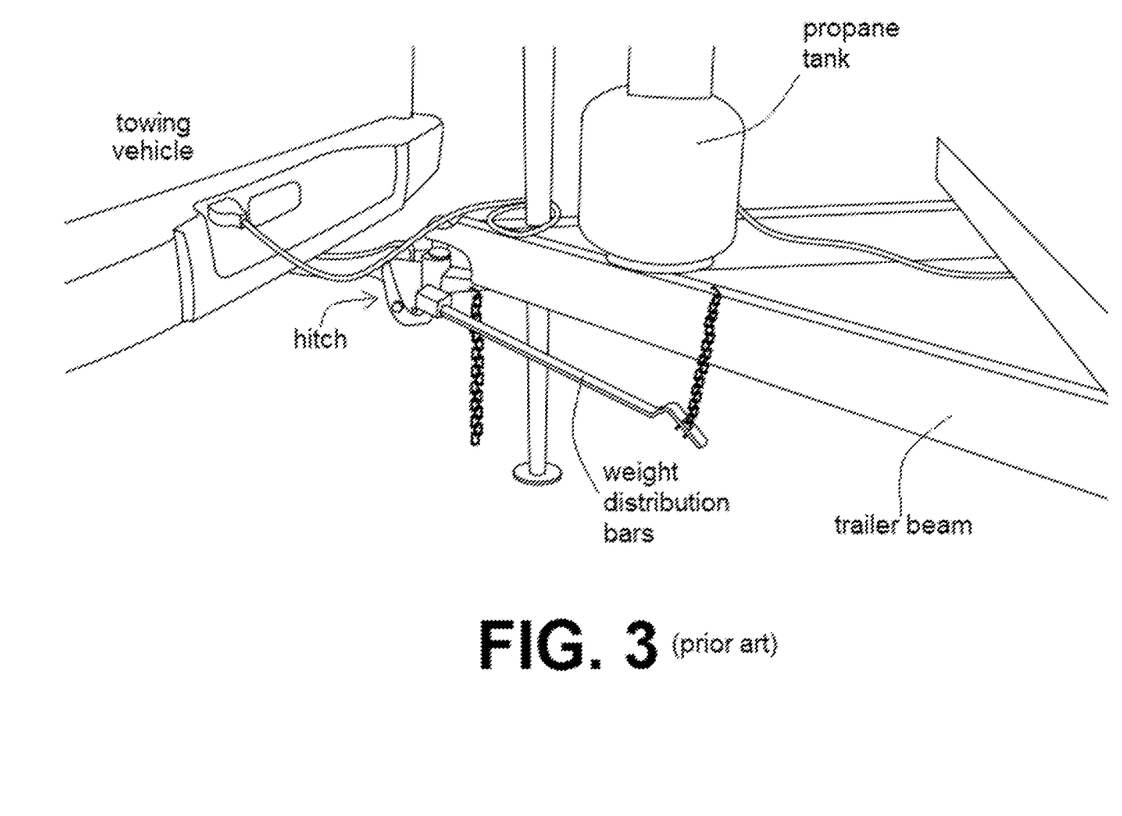
Figure 4A:
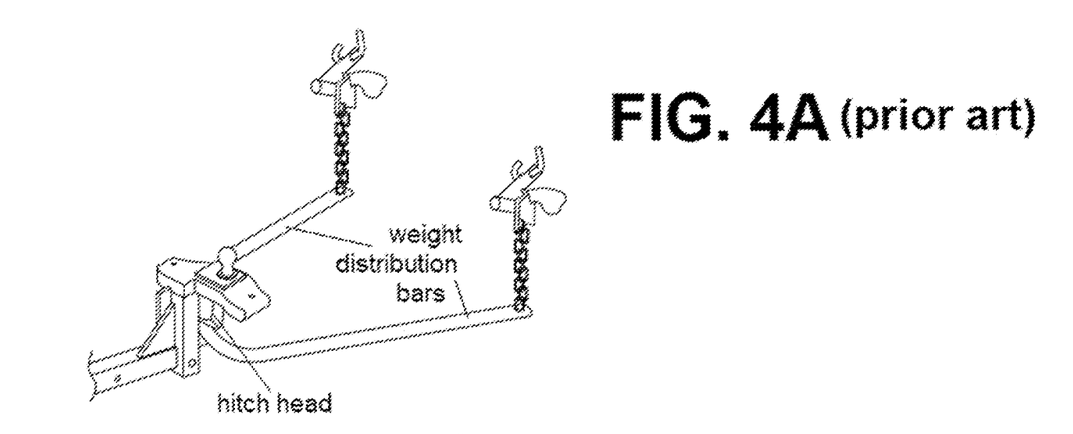
Figure 4B:
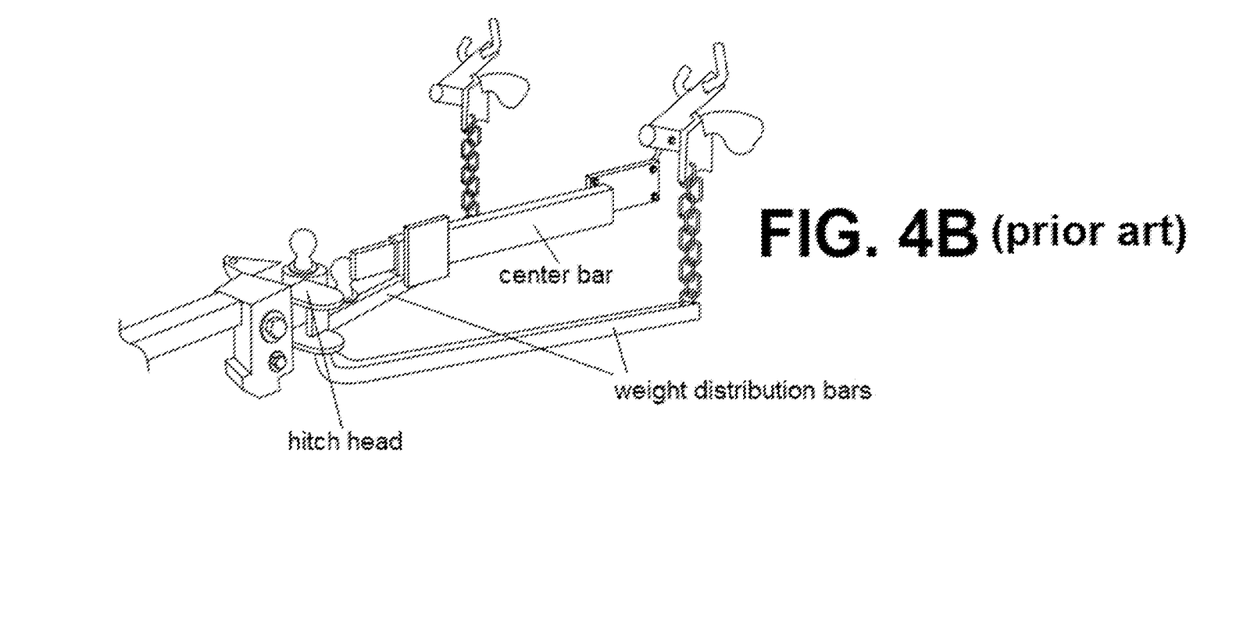

The A-frame rails of the trailer stick out at a front end of the trailer, and as shown in FIG. 3 may also provide a resting place for a trailer battery and propane tanks. These will be referred to herein as frame rails or just "frame". Using the system 500, the hitch head connects to the trailer ball receptacle on the same trailer for the towed item, so a user never needs to worry about losing their trailer equipment. The embodiments herein keep the heavy dirty pointy items within the weight distribution system nicely stored, typically stored right on the trailers beams AKA the trailer's A-frame rails or frame.

The attachment plate 520 attaches to the trailer beam itself, and the main tray 504 holds the various heavy iron/steel parts of the weight distribution system. Meanwhile, the hitch head enclosure 516 vertically accepts an elongated portion typically found with most hitch heads.

Figure 6A:
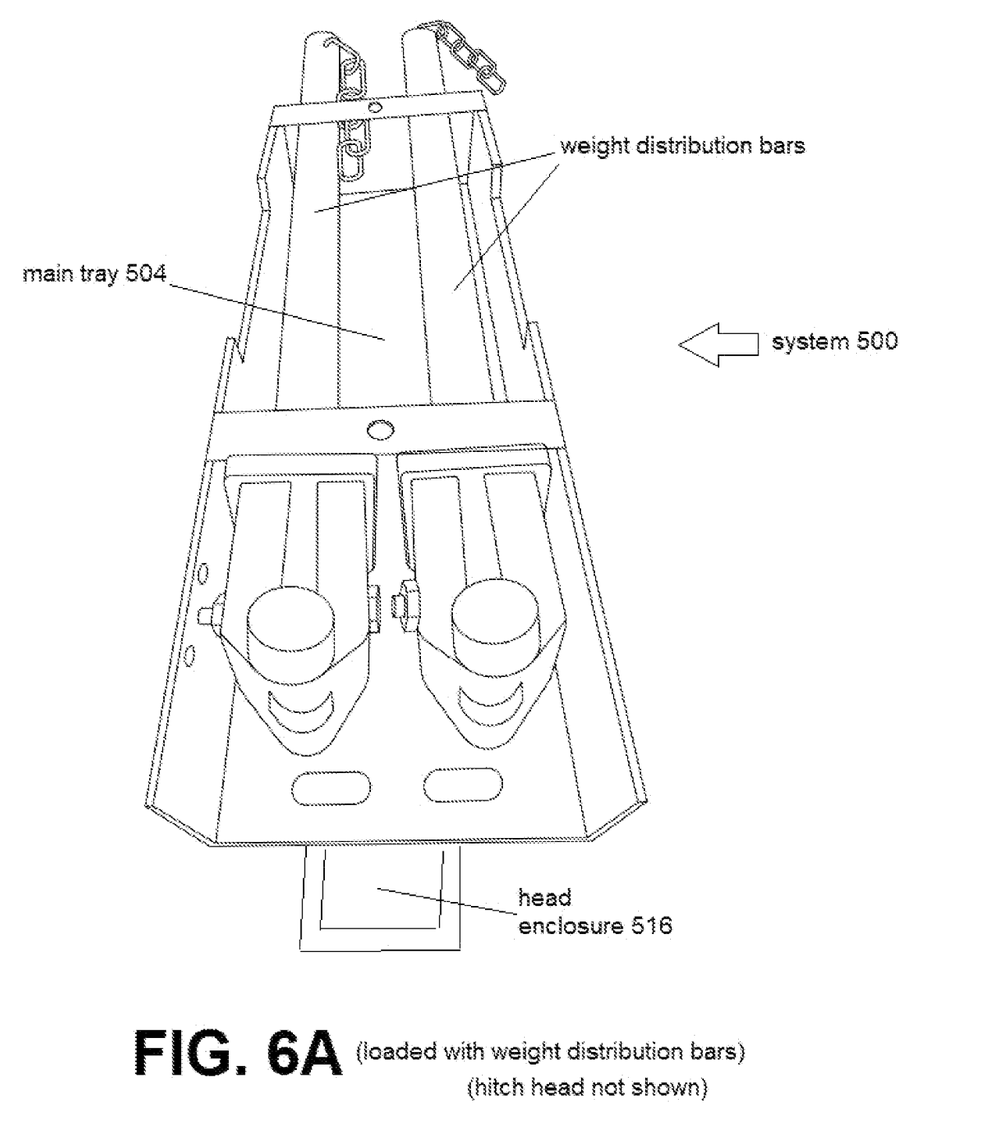
FIGS. 6A, 6B, and 6C show the weight distribution bars and hitch head properly stored within the storage system of FIGS. 5A and 5B.
Figure 6B:
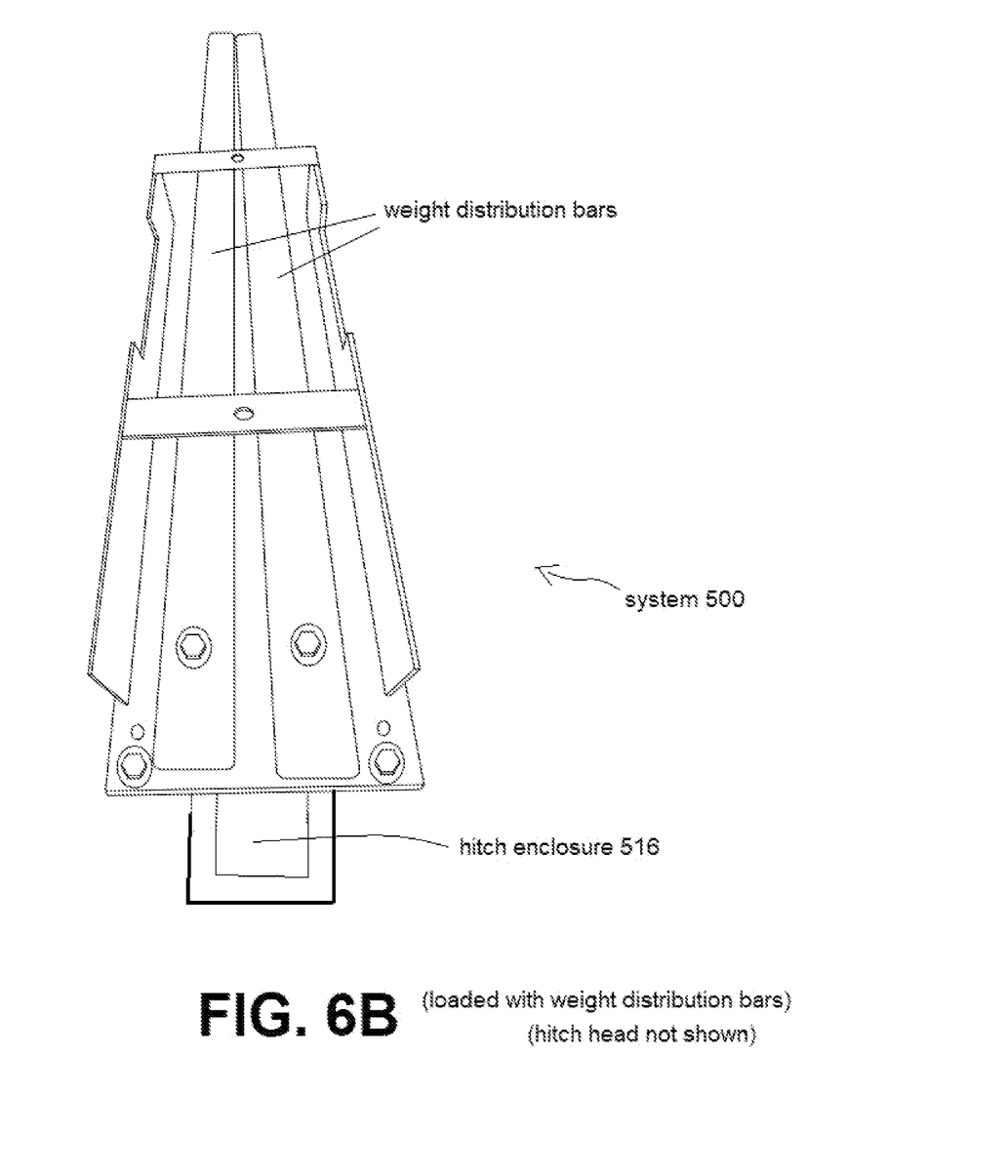
Figure 6C:
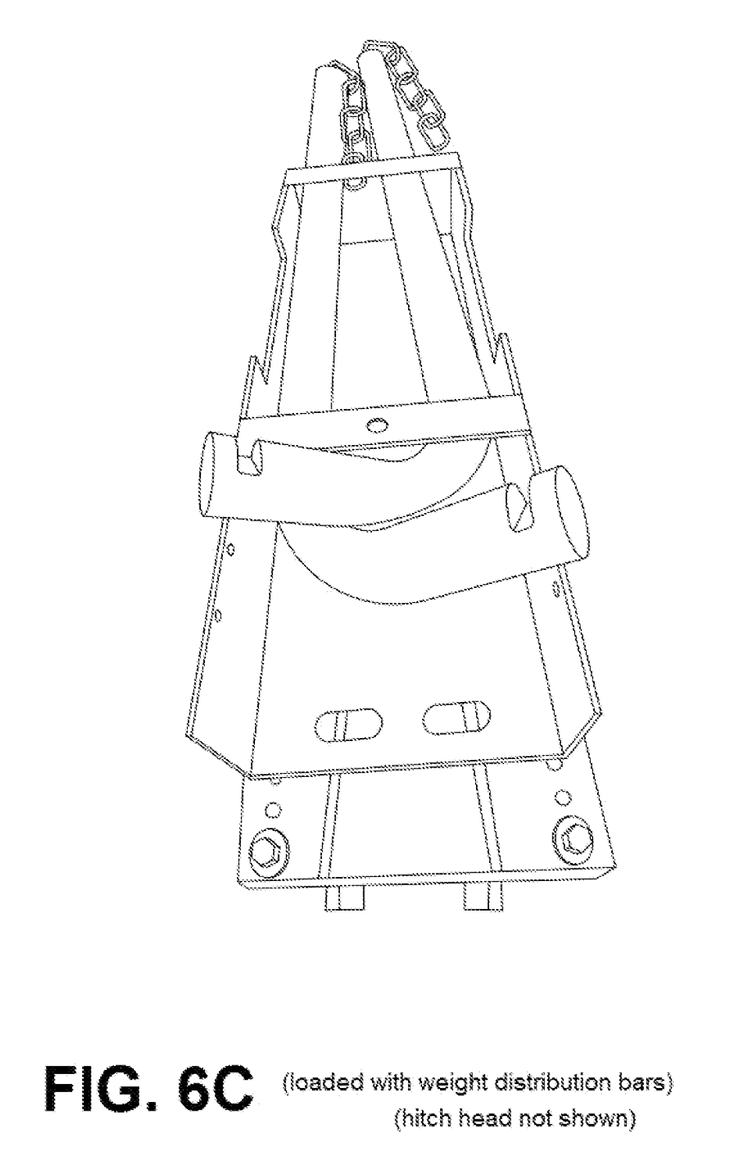

Within this disclosure, it will be assumed that the towing vehicle and trailer are stopped, and not expected to move for e.g. a c couple of days. As such times, it is better to remove the hitch and stabilize the trailer using stationary mechanisms. But at that time, the heavy bulky weight distribution system are in the way, impede foot traffic, are excellent for tripping humans in the dark, and for banging shins and toes. To that end, FIGS. 6A, 6B, and 6C show the weight distribution bars and hitch head properly stored within the main tray 504 of the system 100.

Installation of the Systems 500/700

Figure 9:
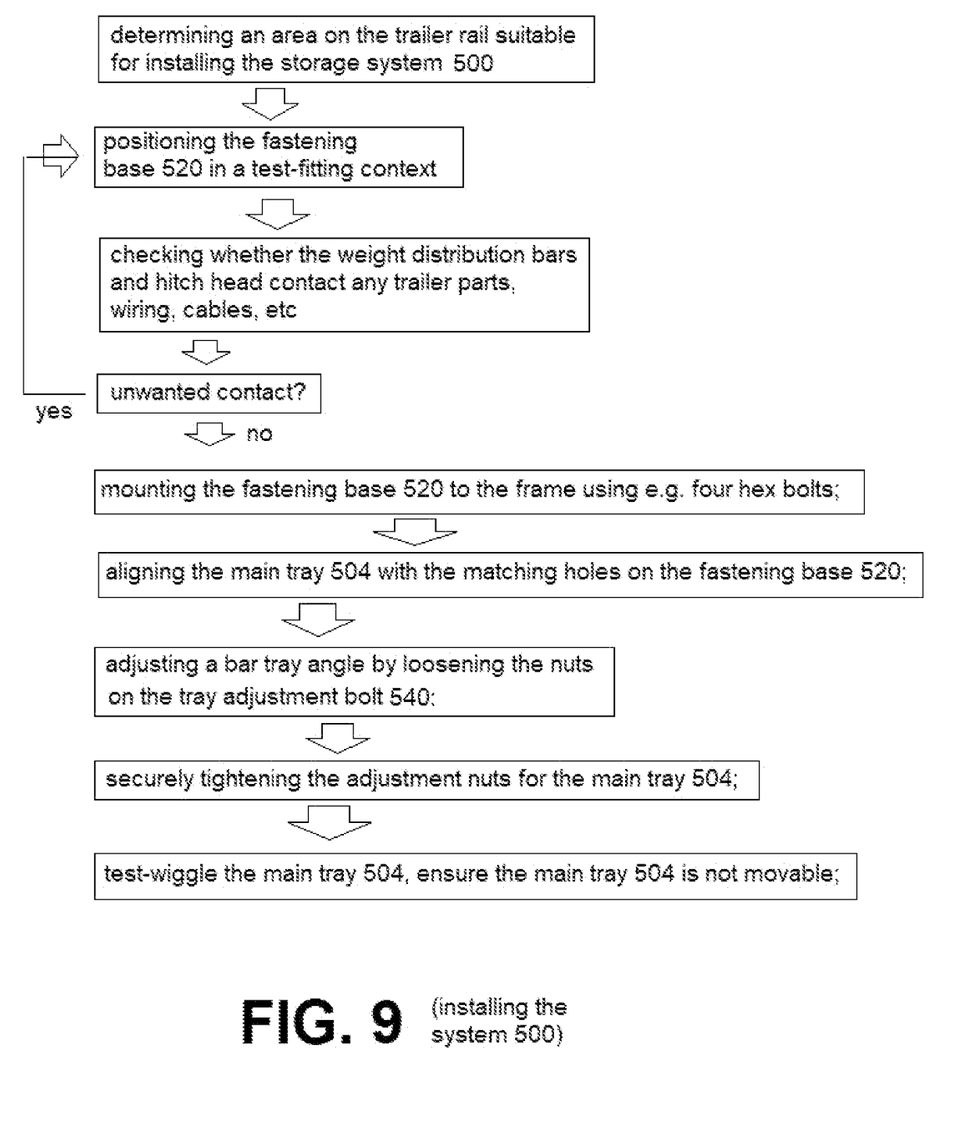
FIG. 9 shows an example method of installing a storage system.
Figure 10:
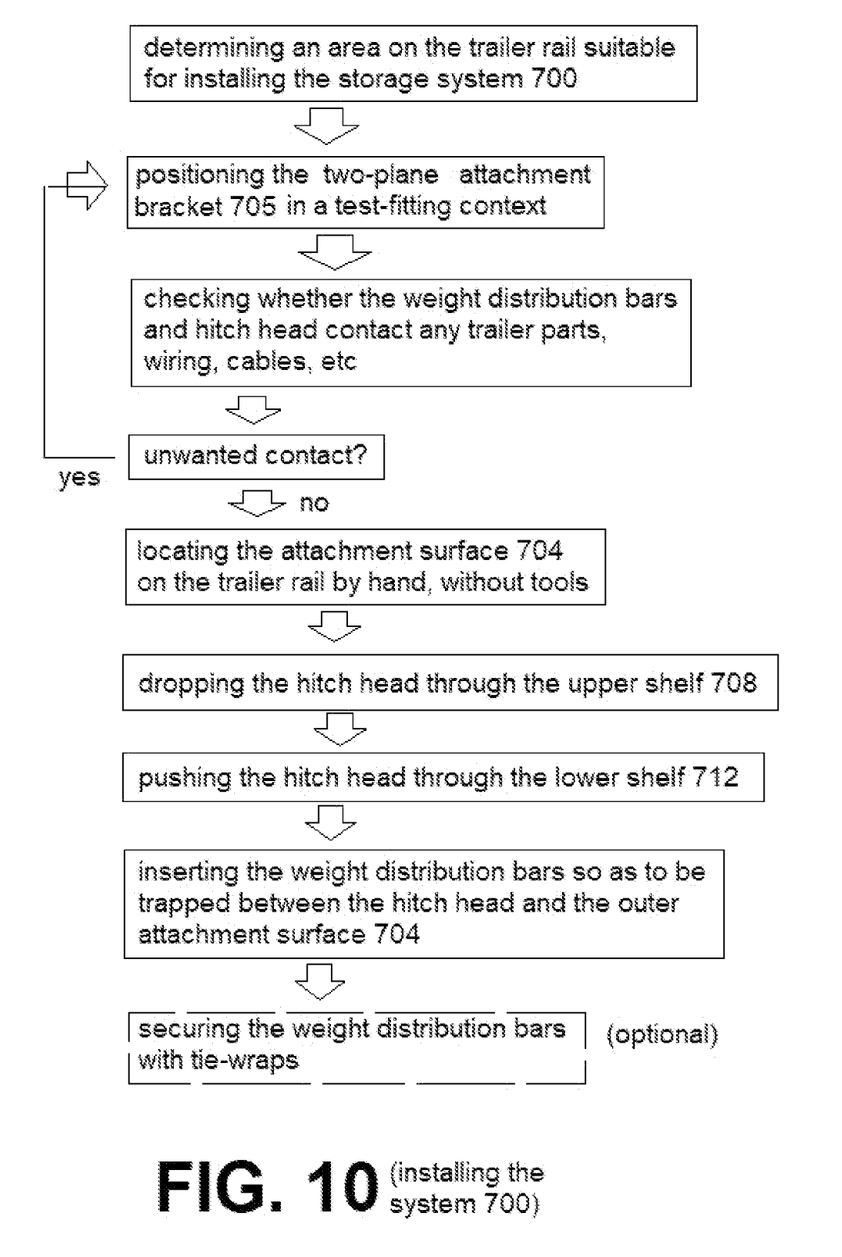
FIG. 10 shows an example method of installing a storage system.

Example flowcharts of the installation process for the systems 500/700 are shown in FIGS. 9 and 10 respectively. As shown in FIG. 9, for the system 500, a user/installer will first determine the area to attach the fastening base 520. Normally there is room on a trailer beam between e.g. the propane tanks (FIG. 3) and the trailer frame rail itself.

However, there are a lot of variations in how trailer elements are put together, and many different styles of trailers. Accordingly, it is necessary to ensure that when stored, the base, bolts, bar tray and hitch bars will not contact/rub any wiring, cables or gas lines. For example, it may be necessary move a battery box further to one side of a trailer beam to make adequate space for the systems 500\700.

Once thus affirmed, once the user/installer is semi-satisfied with the chosen position, that user/installer should test-fit the weight distribution bars and hitch head to ensure that they are not contacting/rubbing against any trailer parts, wiring, cabling, hoses or hitch brackets.

A user will mount the fastening base 520 to the frame using e.g. four hex bolts. Add stainless flat washers to the top of the base and flange nuts to the bottom, aligning the bottom brace with the matching holes on the fastening base 520. Alternately, the fastening base 520 can also be welded to the trailer frame.

Next, the installer will adjust the bar tray angle by loosening the nuts on the tray adjustment bolt 540.

Finally, during final adjustment, the adjustment nuts for the main tray 504 must be securely tightened together to keep the main tray 504 from moving.

The heavier embodiments of the system 500 can be bolted, and some customers have welded the system 500 to the frame. The system 700 would not have this issue, and would never need to be welded, but can be if the user decides it is how they want to make it permanent. A user/purchaser self-performs this installation, although this has its dangers. A typical mistake might be to not install the brackets correctly. With the system 700, such errors are less likely.

Locking and Security

Upon completion of the above steps, the weight distribution bars would typically be sticking out on both side of the trailer frame. One set of ends will be free, but the other set of ends will abut against a cross bar edge of the system 500. Accordingly, in an embodiment, a small lock 548 (FIG. 5A) somewhat similar to a bicycle lock will hang off the main tray 504 of the system 500. Someone with a crowbar or smash-bar could smash the small lock 548, but its presence would likely be helpful in deterring some theft attempts.

Second Embodiment

Figure 7A:
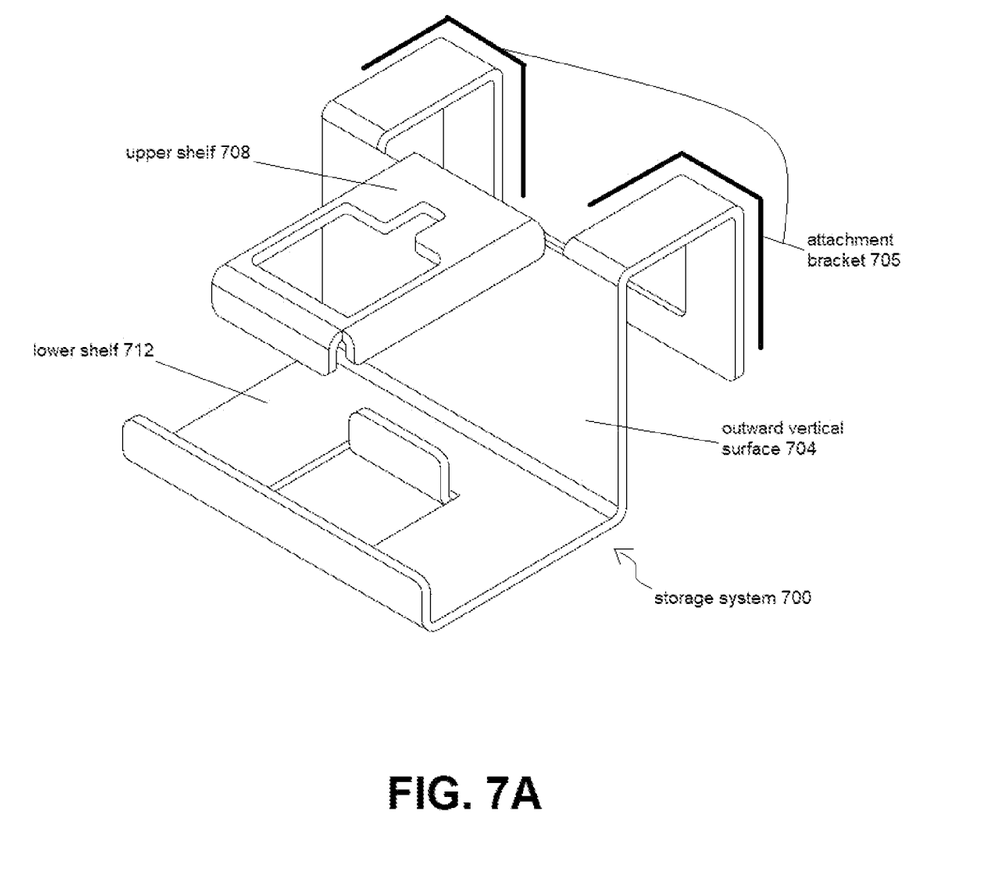
FIGS. 7A, 7B, 7C, 8A, and 8B show example storage systems hanging by gravity on the trailer frame.

An additional embodiment exists, which is lighter and stores and fastens differently. A system 700 comprises an outward vertical surface 704 and an attachment bracket 705. In this case, the term "outward" is with respect to being facing toward the user and away from (outward from) the trailer body, while "inward" will mean facing the trailer body. The system 700 also comprises an upper shelf 708 and a lower shelf 712 protruding horizontally from the outward vertical surface 704.

Figure 7B:
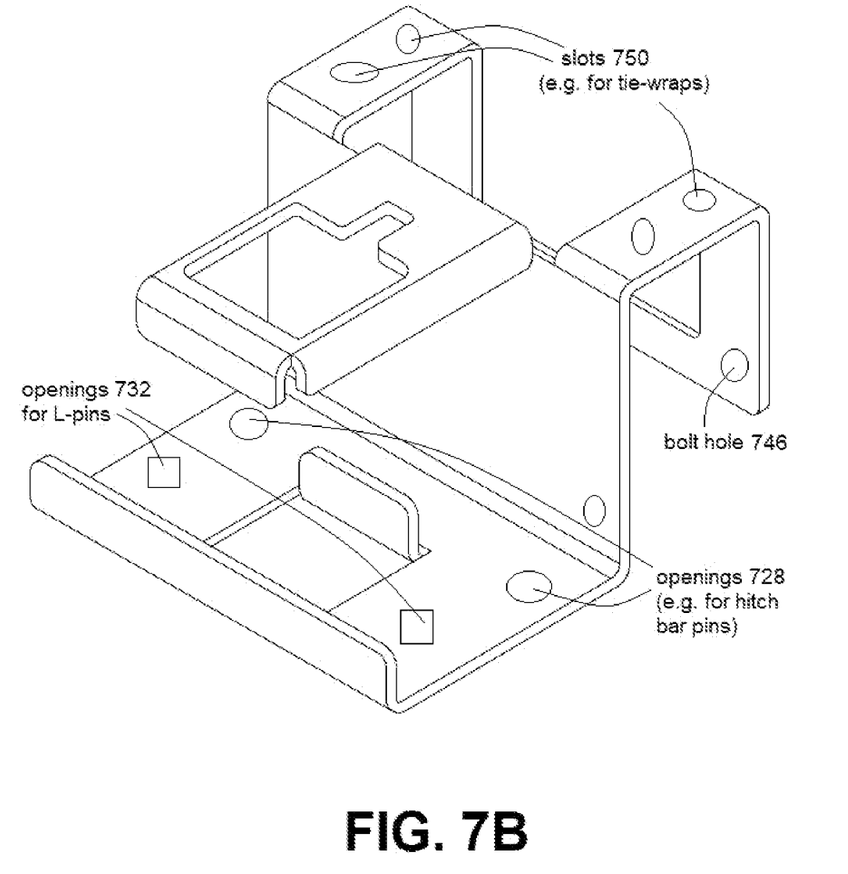
Figure 7C:
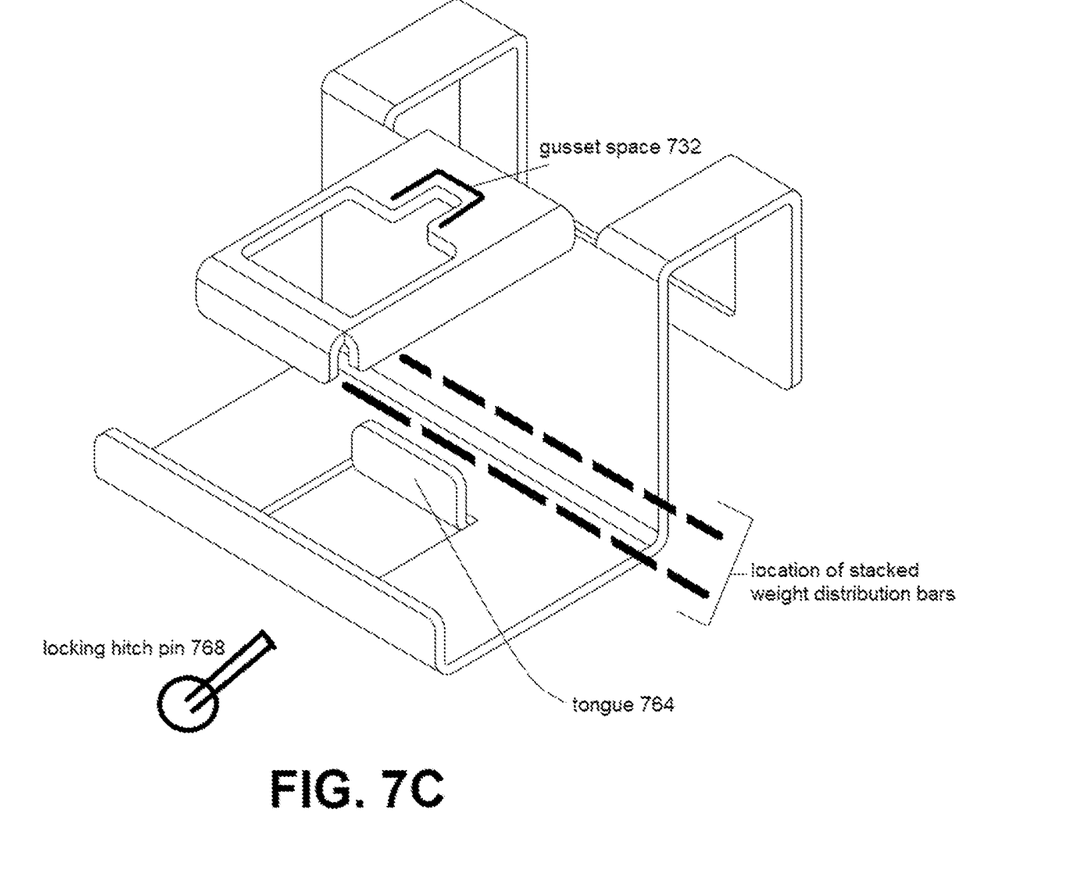

As shown in FIGS. 7A-7B-7C, the system 700 doesn't secure the weight distribution bars exactly like the system 500. This alternate system 700 hangs by gravity on the trailer frame similar to mirrors hanging on home door frames, thus comprising a "lite" version. This lighter version is for people who just want an inexpensive way to store their hitch and weight distribution bars, but don't mind surrendering some security.

In an embodiment, the system 700 will be manufactured from steel and then have a hot-dipped galvanized finish applied thereto. However, it can be manufactured using a variety of metals or composite materials.

FIG. 7B shows an example system 700 having square openings 738 for accommodating L-pins that belong to an equalizer bracket commonly found with weight distribution systems, as well as round openings 742 for hitch bar pins. Further, the system 700 will also have bolt holes 746 in various locations, as dwell as slots 750 for tie wraps for additional mounting options.

FIG. 7C shows how the system upper shelf 708 has a top slot 724 and the lower shelf 712 has a bottom slot 728 for engaging with a hitch head. During use, the hitch head is dropped into the top slot 724 and then pushed through a bottom slot 728 and is secured with a locking hitch pin 768. Thus, the locking hitch pin 768 will also assist in securing the weight distribution bars between the outward vertical surface 704 frame and hitch head, along with the tongue 764. It is well known that hitch-heads sometimes come with a protruding surface on their vertical shaft, such that their cross-section is not always perfectly rectangular. The top slot 724 is configured with a gusset space 732 to accommodate that protruding surface, so the hitch head can drop further down into the two slots 724/728.

Figure 8A:
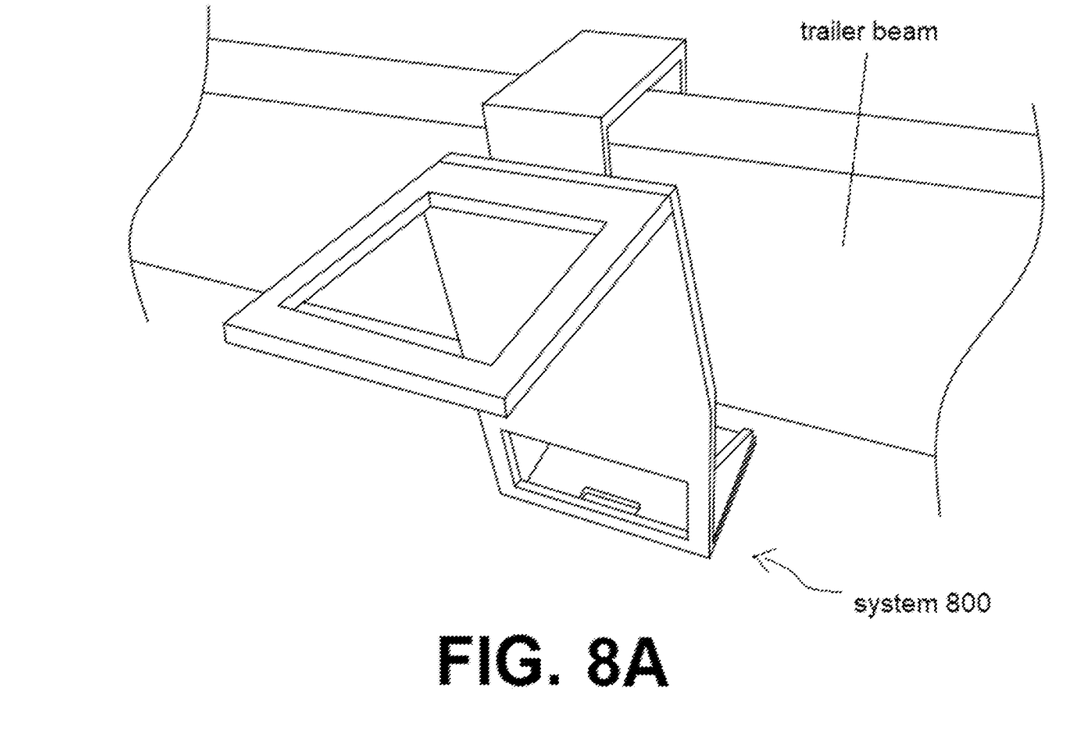
Figure 8B:
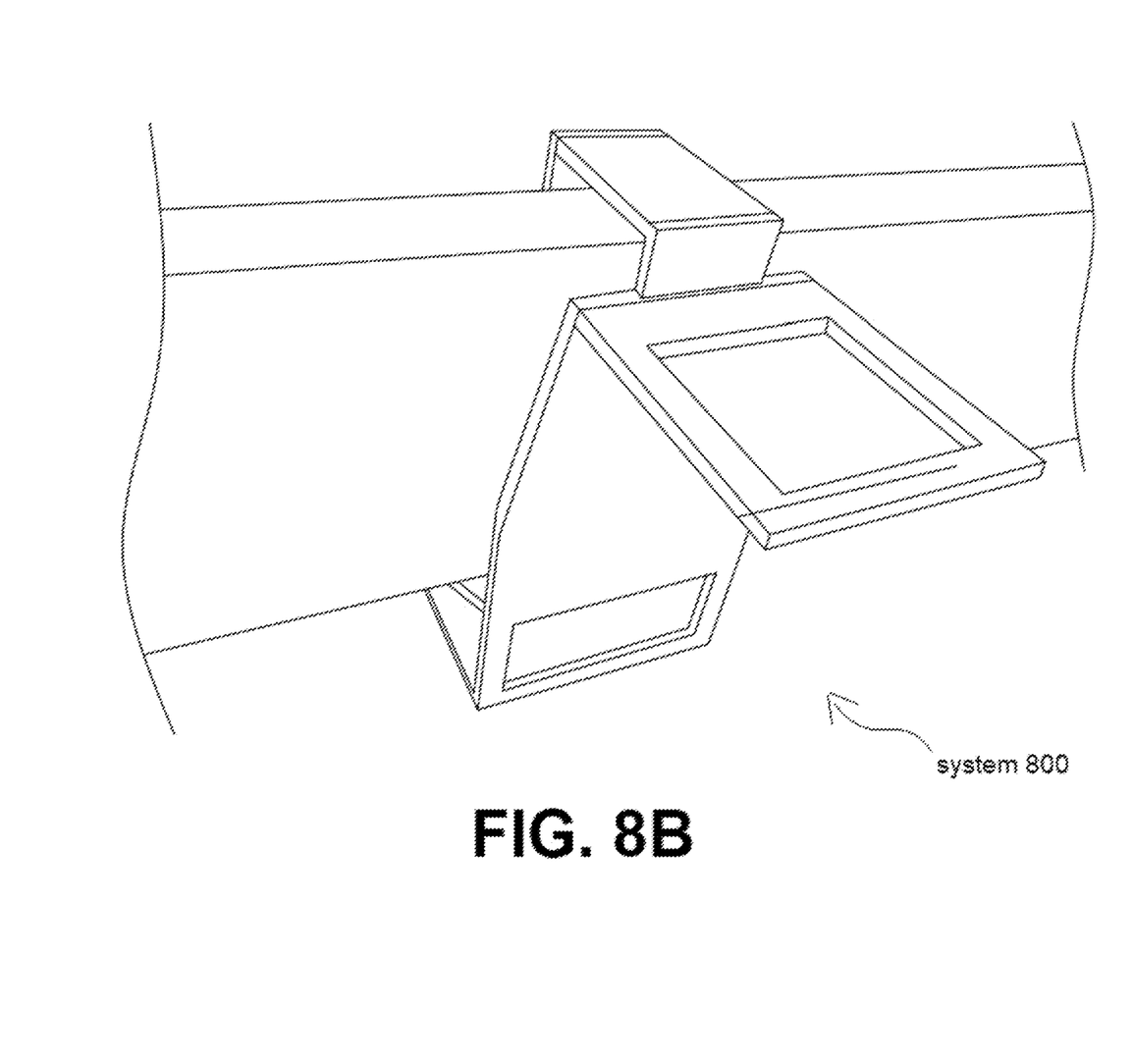

FIGS. 8A-8B show an example system 800 which is similar to the system 700 in that both are free-hanging mechanisms. However, some differences exist, for example the system 800 does not use an upper-lower shelf arrangement.

FIG. 10 shows an example method of installing the system 700. A suitable location must first be found, and then tested with actual weight distribution bars and hitch head, to ensure there is no interference from or with other parts. Then, the storage system 700 is rested onto the frame. Metal tie-wraps can be used to provide added security for the storage system 700. At that point, the storage system itself is installed but not yet necessarily in use.

To use the system, the hitch head must first be dropped through the upper shelf and then the lower shelf, through the two slots the two slots 724/728. A lock 748 can be employed to help secure the hitch head. At that point, it is suitable to insert the two weight distribution bars to fit between the hitch head, the tongue 760, and the outward vertical surface 704.

The system 700 works as follows: the weight distribution bars are stacked on top of each other, parallel to the frame, next to the outward vertical surface 704 and held in place by the body of the hitch head. During use and storage, the outward vertical surface 704 works with the body of the hitch head to trap the weight distribution bars within the system 700. Some assistance is also provided by the tongue 760. It should now be apparent that during use, optimally, the hitch head should be located (stored) within the system 700 prior to inserting the weight distribution bars.

DISCLAIMER

While preferred embodiments of the present e been shown and described herein, it will be obvious to those skilled in the art that such embodiments are provided by way of e ample only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of manufacturing a storage system for a weight distribution mechanism, comprising:
    configuring an attachment surface to be connected with an outward vertical surface;
    configuring the outward vertical surface with an upper shelf and a lower shelf protruding horizontally therefrom;
    configuring the upper shelf to have a top slot configured to accommodate a hitch head;
    configuring the lower shelf to have a bottom slot also configured to accommodate a hitch head, such that during use, the hitch head is dropped into the top slot and then is pushed through a bottom slot; and
    configuring the lower shelf with an opening such that when the hitch head is inserted, the storage system is securable with a locking hitch pin.

2. The method of claim 1, further comprising:
    configuring the top slot with a gusset space suitable for a specific geometry of hitch head.

3. The method of claim 2, further comprising:
    configuring the gusset space to be suitable for a vertical protrusion within a hitch head.

4. The method of claim 1, further comprising: the locking hitch pin assisting in securing weight distribution bars between the outward vertical surface and the hitch head.

5. The method of claim 4, further comprising:
    configuring the lower shelf to have a tongue extending upward therefrom; and
    the tongue assisting in securing the weight distribution bars between the outward vertical surface and the hitch head.

6. The method of claim 1, further comprising: configuring the upper shelf with square openings for accommodating L-pins that belong to an equalizer bracket.

7. The method of claim 6, further comprising:
    configuring the upper shelf with round openings to accommodate and store hitch bar pins.

8. The method of claim 7, further comprising:
    configuring the storage system with bolt holes.

9. The method of claim 1, further comprising:
    configuring the attachment surface to exactly conform with a trailer beam having a rectangular cross-section, such that the storage system hangs on top of the trailer beam and remains in place by gravity.

10. The method of claim 9, further comprising:
    configuring the storage system with slots that accommodate metal tie-wraps for preventing the storage system from falling off the trailer frame.

11. The method of claim 1, further comprising:
    manufacturing the storage system from steel.

12. The method of claim 11, further comprising:
    hot-dipping the system in a galvanized finishing solution.

* * * * *